UNITED STATES PATENT OFFICE.

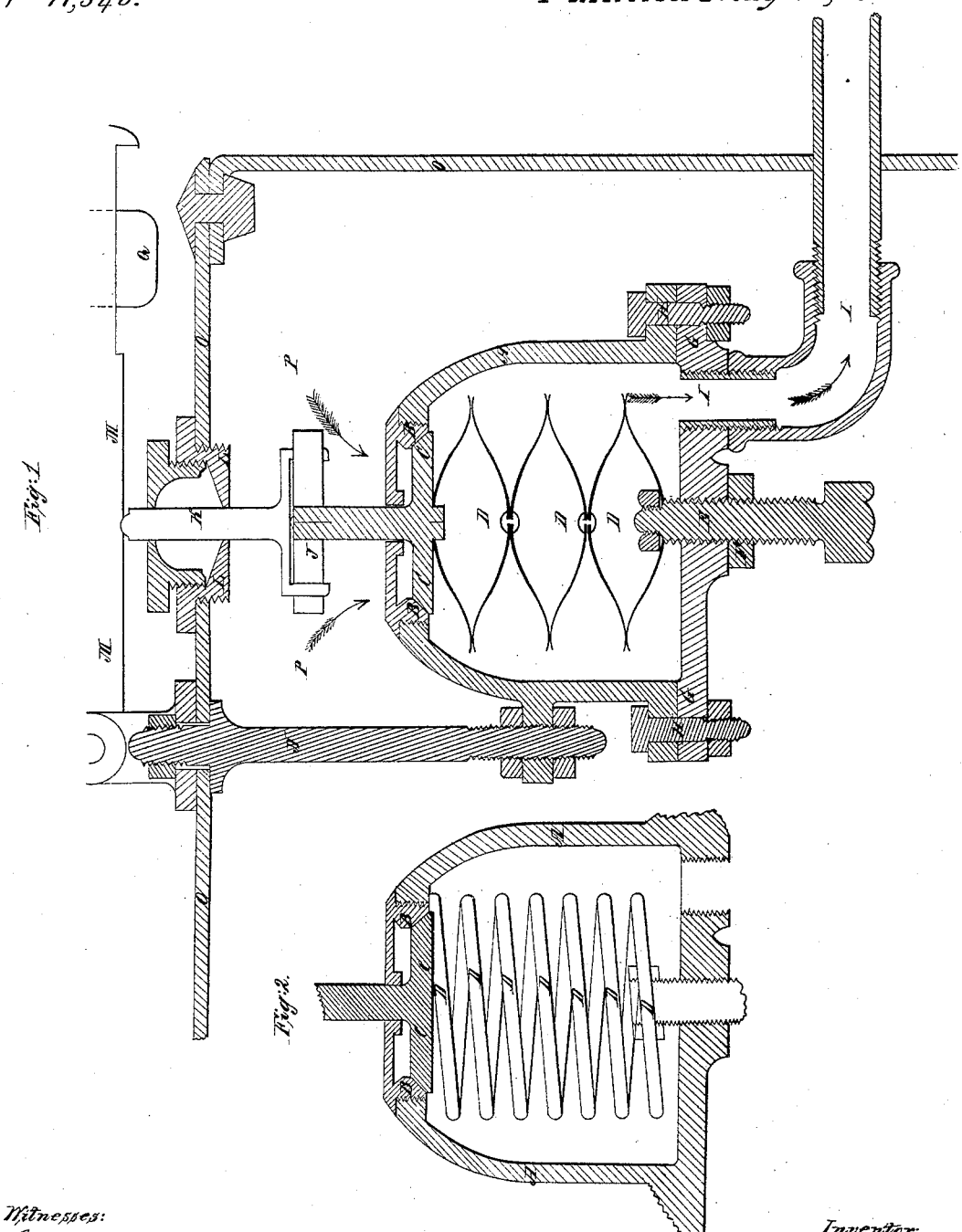

GEORGE P. CLARKE, OF NEWARK, NEW JERSEY, ASSIGNOR TO HIMSELF AND WM. M. LITTELL.

ARRANGEMENT OF SAFETY-VALVES WITHIN STEAM-BOILERS.

Specification of Letters Patent No. 17,348, dated May 19, 1857.

*To all whom it may concern:*

Be it known that I, GEORGE PEMBERTON CLARKE, of Newark, in the county of Essex and State of New Jersey, have invented a new and useful Arrangement of Safety-Valves within Steam-Boilers; and I do hereby declare that the following is a full and exact description thereof, reference being had to the accompanying drawings and to the letters of reference marked thereon.

The nature of my invention consists in constructing an "invisible safety valve," as hereinafter described.

To enable others skilled in the art to make and use my invention I will proceed to describe its construction and operation.

In Figure 1, A, A, represents a box, globe; or cylinder; B, B, valve seat bolted or screwed to A, A; C, C, valve opening inward and fitted to B, B; D, D, D, spring bearing against valve C, C; E, set screw to regulate pressure against valve C, C; F, check nut to fix permanently set screw E; G, G, bottom plate to secure or inclose the whole above; H, H, bolts to secure the bottom plate A, A; I, I, pipe leading through the boiler to the atmosphere; J, cross bar to turn valve C, C, on valve seat B, B; K, forked stem passing through boiler to turn valve C, C; L, L, stuffing box to support forked stem K; M, M, lever outside of boiler to relieve valve C, C, while turning; N, N, bolts to suspend the whole to inside of boiler; O, O, boiler; P, P, steam room; Q, weight on lever M, M, to ascertain at any time the immediate pressure inside of boiler and to detect the overloading of the common safety valve.

In Fig. 2, A, A, the globe, or cylinder; B, B, the valve seat; C, C, the valve opening inward; D, spiral spring. Either kind of spring may be used, the elliptical spring is shown in Fig. 1, D, D.

In the construction of my invention I place the valve within the boiler, in an inverted position, by which arrangement, I am enabled to keep the valve pressed up against its seat, by the spring D, more firmly, and constantly to do its work, and I find the action of the steam more effective on the valve from above downward, through it, and out by means of the tube I, than when otherwise set. The moment the steam rises above the amount the valve is set to carry, the alarm is given and the extra steam is let off. I have found that this arrangement of the valve is of great importance when placed inside of the boiler.

By means of the clevis, K, I can rotate the valve on its seat, the whole operating inside of the boiler, the stem of the clevis only protruding through it, thus arranged I have a perfect safety valve and alarm, beyond the control of the engineer, rendering it impossible for him to overload it.

In the operation of my invention, the boiler is supposed to stand with safety 100 pounds pressure to the square inch, and the engineer wishes to carry 50 pounds, but in no case over 60 pounds. He sets one of these valves (graduated by the maker and graduated accordingly) at 60 pounds. The common outside valve through carelessness sticks, or is overloaded by the engineer to over 60 pounds, the instant the steam exceeds 60 pounds the valve C, C, gives way; the steam rushes through the globe A, A, out of the pipe I, I, in the direction of the arrows to the outside of the boiler; the valve being inaccessible to the engineer becomes an instant telltale to all within hearing distance, whether engineer, fireman, passenger or visitor.

It will be seen that, as the springs are made adjustable by means of the set screw K, and as the springs when constructed are set at the weakest point, say at 40 pounds, then by adjusting the set screw I am enabled to increase the tension of the spring D′, until it will bear a pressure of 200 pounds, thus accomplishing by the same apparatus, what is required by different machines, that is, the ability to vary the pressure from 40 to 200 pounds, or more, if required. Its advantages are to supersede the various instruments now in use including the fusible plug. It is inaccessible to the engineer, can not be overloaded, and is not exposed to the atmosphere and hence is susceptible to the immediate and direct pressure of the steam in the boiler, and in instant communication with the observer.

What I claim as my invention, and desire to secure by Letters Patent is,

The arrangement of the inverted valve C in globe A, pressed to its seat, by the spring D, from below the clevis, K, and the escape pipe I, extending through the boiler, all constructed, and arranged within the boiler as described, and for the purpose set forth.

GEORGE P. CLARKE.

Witnesses:
STEPHEN R. HAINES,
ISRAEL COYINE.